(12) United States Patent
Montgomery et al.

(10) Patent No.: US 11,895,107 B2
(45) Date of Patent: *Feb. 6, 2024

(54) BROWSER EXTENSION FOR VALIDATING COMMUNICATIONS

(71) Applicant: Bank of America Corporation, Charlotte, NC (US)

(72) Inventors: Andrew Paul Montgomery, London (GB); Sanjay Bhanu, Camberley (GB); Stuart David Ford, Slapton (GB); Ricardo Varanda, Reading (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,652

(22) Filed: Dec. 20, 2022

(65) Prior Publication Data

US 2023/0128881 A1  Apr. 27, 2023

Related U.S. Application Data

(63) Continuation of application No. 17/143,817, filed on Jan. 7, 2021, now Pat. No. 11,582,223.

(51) Int. Cl.
*H04L 67/02* (2022.01)
*H04L 9/40* (2022.01)
*H04L 67/141* (2022.01)

(52) U.S. Cl.
CPC .......... *H04L 63/0823* (2013.01); *H04L 67/02* (2013.01); *H04L 67/141* (2013.01)

(58) Field of Classification Search
CPC ... H04L 67/564; H04L 67/55; H04L 63/1483; H04L 63/126; H04L 63/0823; H04L 67/02; H04L 67/141
See application file for complete search history.

(56) References Cited

U.S. PATENT DOCUMENTS 7,630,986 B1   12/2009  Herz et al.
8,448,241 B1 *  5/2013  Kadakia ............... G06F 21/577
                                                           726/25

(Continued)

FOREIGN PATENT DOCUMENTS

EP         2854365 A1      4/2015

OTHER PUBLICATIONS

E. Lawrence, "Avoiding the Not Secure Warning in Chrome", published Dec. 2020, The Wayback Machine—https://web.archiveve.org/web/20201212211208/ visited on Aug. 28, 2021, pp. 4.

(Continued)

*Primary Examiner* — Cheikh T Ndiaye
(74) *Attorney, Agent, or Firm* — Banner & Witcoff, Ltd.

(57) ABSTRACT

A computing device comprising a secure browser extension for a web browser monitors for satisfaction of one or more operating conditions to identify whether one or more unauthorized applications are intercepting web browser communications. Based on satisfaction of at least one operating condition, the secure browser extension of the computing device sends an HTTPS request to a known service via the web browser. The secure browser extension receives an HTTPS response to the HTTPS request via the web browser. The secure browser extension determines whether the certificate included in the HTTPS response is trusted by the secure browser extension. Based on determining the certificate is not trusted, the secure browser extension terminates the web browser session and generates a notification for display at the computing device that indicates web browser communications are compromised.

20 Claims, 6 Drawing Sheets

(56) References Cited

U.S. PATENT DOCUMENTS

| | | |
|---|---|---|
| 8,549,298 B2 | 10/2013 | Rouskov et al. |
| 8,566,901 B2 | 10/2013 | Kay et al. |
| 8,566,919 B2 | 10/2013 | Meisel |
| 8,838,973 B1 | 9/2014 | Yung et al. |
| 9,225,803 B2 | 12/2015 | Nanduri et al. |
| 9,578,044 B1 | 2/2017 | Sharma et al. |
| 9,691,051 B2 | 6/2017 | Rexer et al. |
| 10,157,280 B2 | 12/2018 | Amir et al. |
| 10,462,216 B1 | 10/2019 | Vysotsky et al. |
| 2006/0085421 A1 | 4/2006 | Backhouse et al. |
| 2008/0140442 A1* | 6/2008 | Warner ............ G06Q 30/0613 705/26.41 |
| 2009/0282485 A1 | 11/2009 | Bennett |
| 2009/0292925 A1 | 11/2009 | Meisel |
| 2010/0275024 A1* | 10/2010 | Abdulhayoglu ........ H04L 9/321 713/175 |
| 2013/0019092 A1 | 1/2013 | Levow |
| 2016/0142438 A1 | 5/2016 | Pastore et al. |
| 2017/0026363 A1* | 1/2017 | Sauve ................. H04L 63/0823 |
| 2017/0257393 A1 | 9/2017 | De Barros et al. |
| 2018/0295137 A1 | 10/2018 | Zager et al. |
| 2019/0215304 A1 | 7/2019 | Yang et al. |
| 2019/0222588 A1 | 7/2019 | Marzorati et al. |
| 2020/0082124 A1 | 3/2020 | Pedersen |
| 2020/0250316 A1 | 8/2020 | Rickerd et al. |
| 2020/0356661 A1 | 11/2020 | Stoletny et al. |

OTHER PUBLICATIONS

J. White, "Improve Your Privacy and Security with HTTPS Everywhere", published Aug. 25, 2017, https://mediam.com, visited on Aug. 28, 2021, pp. 5.

Serge Truth, How to Test for Man-in-the-Middle VulnerabilitiesHow Vulnerabilities, Published Jun. 21, 2011 by securityinnovation.com, pp. 1-23.

Amos Kingatua, 6 HTTP MITM Attack Tools for Security Researchers, Published Jul. 7, 2021 by geekflare.com, pp. 1-21.

* cited by examiner

BROWSER EXTENSION FOR VALIDATING COMMUNICATIONS

CROSS REFERENCE TO RELATED APPLICATION(S)

This application is a continuation of and claims priority to U.S. patent application Ser. No. 17/143,817 entitled "Browser Extension for Validating Communications" filed on Jan. 7, 2021, which is incorporated by reference in its entirety.

BACKGROUND

Aspects of the disclosure relate to identifying compromised communications via a computing device. One or more aspects of the disclosure relate to a computing platform having a web browser extension that is capable of detecting malicious software applications that access web browser communications and preventing compromised web browser communications at the computing platform.

Today, communications (e.g., web browser communications) associated with a variety of endpoint computing devices (e.g., personal computing devices, mobile phones, tablets, and the like) are vulnerable to unauthorized exposure. These communications may be compromised via malicious applications operating on the endpoint computing device itself, as well as via compromised computing devices running malicious software that access networked devices operating between the endpoint computing devices and server devices. The malicious applications (e.g., middle agents) may, for example, execute "man in the middle" interception of communications, where a third party computing device may operate as a proxy to monitor and/or modify communications between the endpoint computing devices and the server devices without user consent. As such, a user of a compromised endpoint computing device may expose a user's private and/or sensitive information (e.g., login credentials, security keys, and the like) to a third party during networked communications, such as when communicating with a server device via a web browser.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting "man in the middle" interception of web browser communications and preventing exposure of sensitive information via a web browser.

In some cases, a computing device (e.g., a laptop computing device, a desktop computing device, a mobile phone, a tablet, and the like) may include an installed web browser. The web browser may be an application stored on a computer-readable media device of the computing device and may enable the computing device to access and/or request information (e.g., a web page) from remote services and/or local services hosted at a remote computing device and/or a local computing device. In some cases, the computing device may include a browser extension such as an application (e.g., an add-on, a plugin, an extension, and the like) stored on a computer-readable media device of the computing device to supplement, add, and/or otherwise modify the functionality of the web browser. The browser extension may include one or more computer readable instructions, when executed, to enable detection of compromised communications associated with one or more malicious applications (e.g., "man in the middle" applications, malware, and the like) operating at the computing device and/or at an intermediate network device. The browser extension may prevent the one or more malicious applications from intercepting communications (e.g., via Hypertext Transfer Protocol Secure (HTTPS)) sent and/or received by the computing device via the web browser.

The browser extension may determine whether communications sent and/or received by the web browser are compromised, for example, before the web browser sends sensitive information (e.g., login credentials, security keys, passwords, and the like) to a server device. To preemptively detect compromised communications, the browser extension may send (or cause to send), by the web browser, an HTTPS request to a known remote service hosted at a remote computing device (e.g., a server device). The browser extension may trust one or more Certificate Authorities (CAs), where the one or more CAs issue a certificate (e.g., a Transport Layer Security/Secure Sockets Layer (TLS/SSL) certificate) for the known remote service. Based on whether a malicious application (e.g., a "man in the middle" application) is operating at the computing device and/or at an intermediate network device, the browser extension may receive, by the web browser, an HTTPS response with an unknown/invalid certificate (e.g., from the malicious application) or an HTTPS response with the valid certificate of the known remote service. The browser extension may receive an HTTPS response with an unknown/invalid certificate, for example, if a malicious application that intercepts communications (e.g., web browser communications) is operating at the computing device and/or at an intermediate network device. The browser extension may receive an HTTPS response with the valid certificate of the known remote service, for example, if a malicious application that intercepts communications is not operating at the computing device and/or an intermediate network device. Based on receiving an HTTPS response with an unknown/invalid certificate, the browser extension may deactivate communications to/from the web browser and/or may deactivate the web browser tab, window, and/or session. In some cases, based on receiving an HTTPS response with an unknown/invalid certificate, the browser extension may generate a notification for display via the web browser at a display device of the computing device, where the notification includes an indication that communications are compromised. Based on receiving an HTTPS response with the valid certificate of the known remote service, the browser extension may permit the web browser to remain active and send/receive communications.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Today, malicious applications, such as middle agents, may operate to intercept, monitor, and/or otherwise control communications from one or more computing devices (e.g., endpoint computing devices, server computing devices, and the like). These communications may include client-server communications, such as those between endpoint computing devices (e.g., personal computing devices, mobile phones, tablets, and the like) and provider computing devices (e.g., server computing devices) via a network (e.g., a local area network, a wide area network, and the like). A middle agent may operate on and/or access an endpoint device, a provider device, and/or an intermediate network device (e.g., a transport device, a router device, and the like) to intercept or otherwise monitor communications and to steal sensitive and/or private information without user and/or provider consent. For example, a middle agent operating on and/or accessing an intermediate network device may operate as a proxy to intercept an HTTPS request from a web browser of an endpoint computing device, where the request includes sensitive login credential information for accessing a financial account on a banking website. The middle agent may forward an HTTPS request to the intended remote service (e.g., a banking website) hosted at a server device, where the HTTPS request may include information that indicates the intermediate network device associated with the middle agent as the source of HTTPS request. The remote service hosted at the server device may receive the HTTPS request and may send an HTTPS response that includes a certificate associated with the remote service to the intermediate network device. The middle agent may intercept and/or receive the HTTPS response at the intermediate computing device. The middle agent may forward an HTTPS response that includes a certificate associated with the middle agent to the web browser, allowing the middle agent to monitor and control the communications between the personal computing device and server device without the consent of each party. But, the middle agent may be limited by HTTPS to send communications that include a certificate associated with the middle agent, rather than the certificate associated with the remote service hosted at the server device. If the certificate associated with the middle agent is invalid, expired, and/or otherwise untrusted by the endpoint computing device, the middle agent may be detected.

In some cases, a computing device, such as a personal computing device, may include a browser extension integrated with a web browser. The browser extension may be stored as an application, plugin, and/or as source code on a computer-readable media device of the computing device. The source code of the browser extension may be executed by a web browser. While web browsers commonly permit the use of browser extensions to modify the functionality of the web browsers, existing browser extensions lack capabilities to detect "man in the middle" (e.g., "man in the browser") interception by a malicious application (e.g., a middle agent) and prevent unauthorized data exposure to a third-party via the web browser. As such, a need has been identified for an improved computing system that uses a browser extension to detect compromised client-server communications via a web browser and prevent exposure of sensitive information to an unknown third-party.

An improved browser extension may enable detection of compromised web browser communications associated with middle agents. To determine whether communications via the web browser are compromised (e.g., by a middle agent operating at the computing device) and/or to prevent exposure of sensitive information, the browser extension may automatically send a test request (e.g., an HTTPS request) to a remote service via a network (e.g., a wide area network (WAN)). The remote service may be an application, a program, website, and/or other data hosted remotely (e.g., at a server) that is accessible via a network. The remote service may be a known service, where the browser extension trusts the domain associated with the remote service via at least one certificate (e.g., a TLS/SSL certificate) issued by a configured (e.g., trusted) certificate authority (CA). The browser extension may send a test request to a remote service, for example, based on one or more conditions. The one or more conditions may include a startup/activation of the web browser, a communication and/or connection (e.g., an attempted communication and/or connection) by the web browser via HTTPS (e.g., to send login credentials, security keys, and the like), and/or a communication and/or connection to a configured service via the web browser. In some cases, the condition may be the expiry of a configured time duration.

Based on sending the request to a remote service, the browser extension may wait for a response (e.g., an HTTPS response) before allowing further communications. The browser extension expect to receive an HTTPS response that includes a known (e.g., trusted/valid) certificate associated with the remote service and may identify a problem if an unknown and/or invalid certificate is received. The known certificate may be issued by a CA that is trusted by the browser extension. The browser extension may not expect to receive an HTTPS response with a known certificate associated with the remote service, for example, if a middle agent is operating at the computing device and/or at an intermediate network device, as the middle agent may intercept communications between the web browser and remote service and forward an HTTPS response to the computing device with a certificate associated with the middle agent. The browser extension may expect to receive an HTTPS response with a valid certificate associated with the remote service, for example, if a middle agent is not operating at the computing device and/or at an intermediate network device, as the remote service may send an HTTPS response to the web browser with the certificate (e.g., issued by a trusted CA) associated with the remote service.

Based on receiving the HTTPS response with the unknown/invalid certificate, the browser extension may determine that communications to the remote service (and other communications via the web browser) are compromised. Based on determining that communications to the remote service are compromised, the browser extension may generate, for display at a display device of the computing device, a notification (e.g., an error message, a pop-up window, an audio indication, a visual indication, an alert message, and the like) indicating that communications via the web browser are compromised. In some cases, the browser extension may deactivate communications to and/or from the web browser and/or may close/deactivate the web browser to prevent exposure of information (e.g., sensitive information) to a third-party. In some cases, the browser extension may receive an HTTPS response with a valid certificate. Based on receiving the HTTPS response with the valid certificate, the browser extension may determine that communications to the remote service (and other communications via the web browser) are not compromised (e.g., secure). Based on determining that communications to the remote service are not compromised, the browser extension may permit the session at the web browser to continue. In some cases, the browser extension may generate, for display at a display device of the computing device, a notification indicating that communications via the web browser are secure.

Figure 1A:
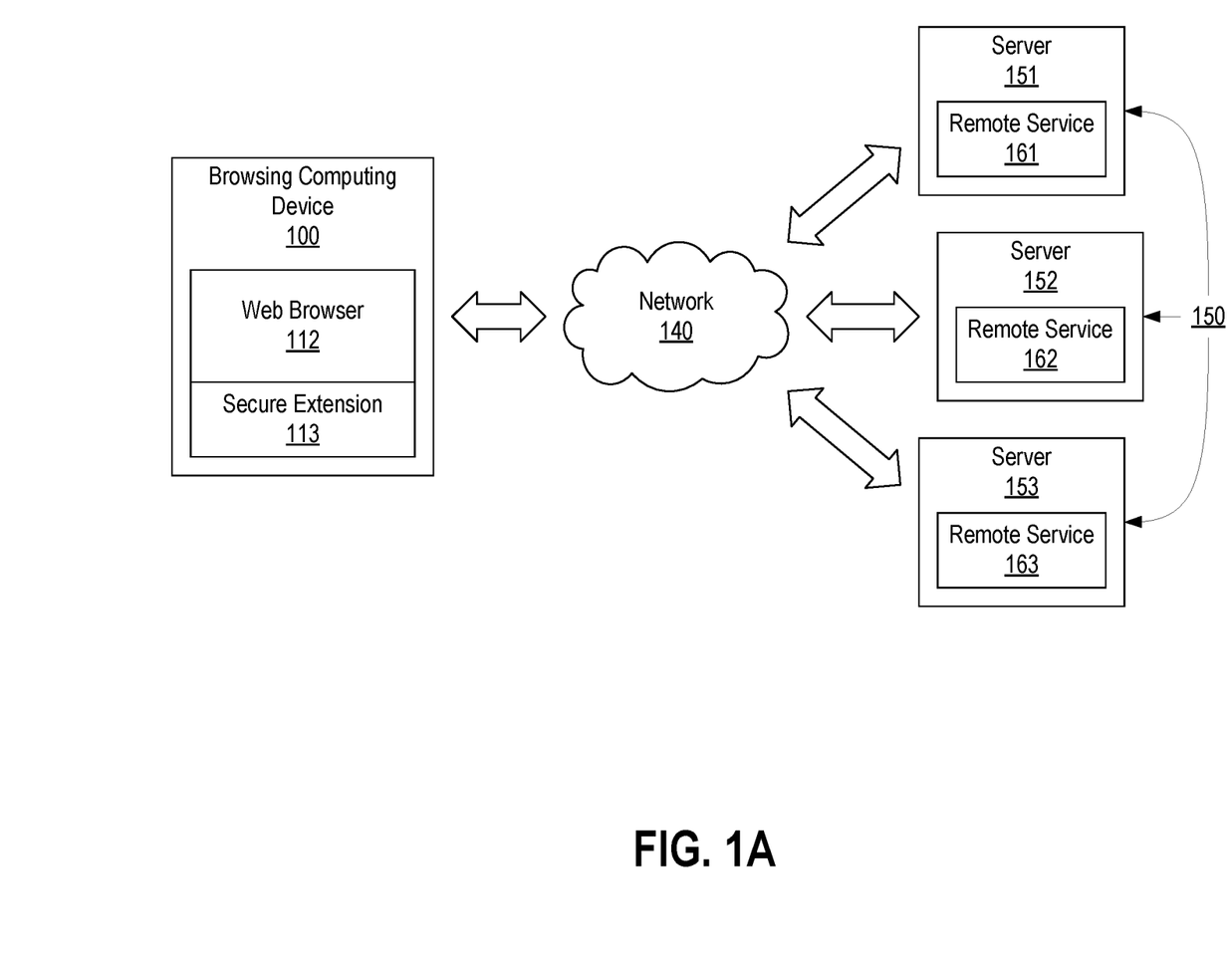
FIG. 1A shows an illustrative example of expected communications for an uncompromised system in accordance with one or more aspects described herein.
Figure 1B:
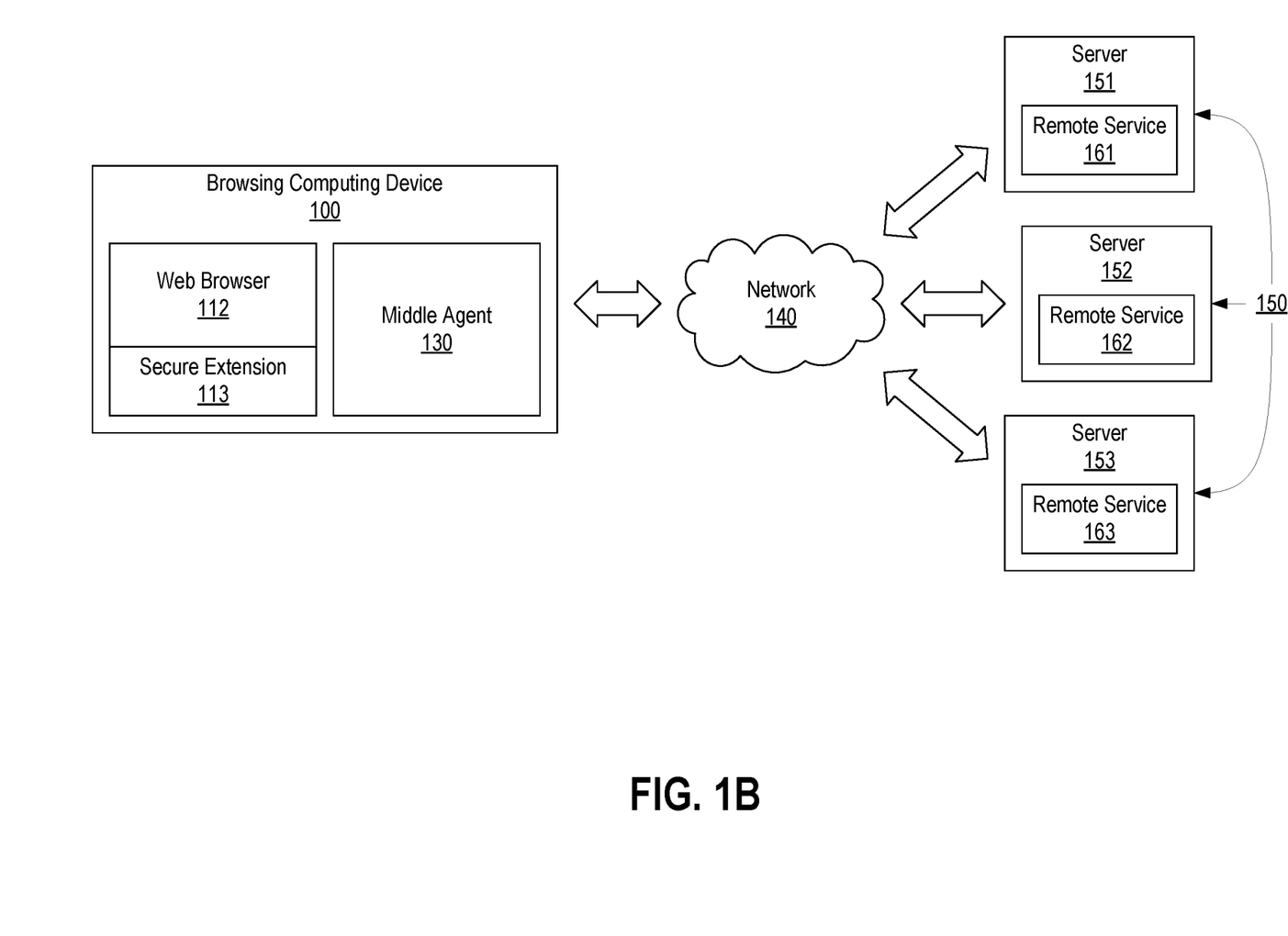
FIG. 1B shows an illustrative example of expected communications for a compromised system in accordance with one or more aspects described herein.
Figure 1C:
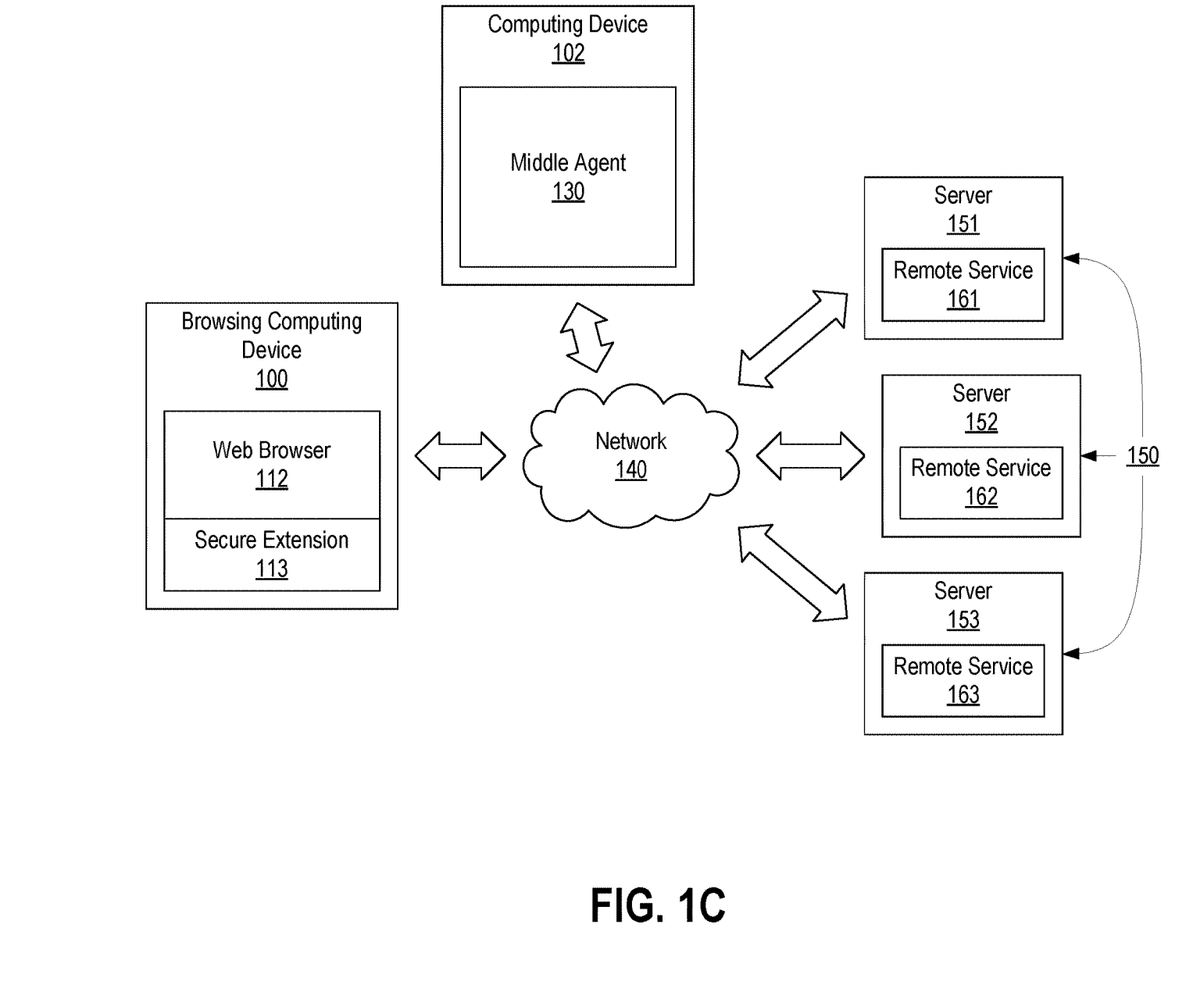
FIG. 1C shows an illustrative example of expected communications for a compromised system in accordance with one or more aspects described herein.

FIG. 1A, FIG. 1B, and FIG. 1C show illustrative examples of expected communications for an uncompromised system and compromised systems in accordance with one or more aspects described herein. FIG. 1A shows an illustrative example of expected communications for an uncompromised system. FIG. 1B and FIG. 1C show illustrative examples of expected communications for compromised systems. Referring to FIG. 1A, the browsing computing device 100 may be a laptop computing device, a desktop computing device, a mobile phone, a tablet, and/or any other personal computing device. The browsing computing device 100 may be an endpoint computing device for client-server communications between the browsing computing device 100 and a provider computing device (e.g., one or more servers 150). The browsing computing device 100 may be communicatively coupled to one or more networks 140. The browsing computing device 100 may include any or all of the characteristics of the browsing computing device 301 as described herein with respect to FIG. 3 and/or the workstations 401 as described herein with respect to FIG. 4. The one or more networks 140 may include any or all of the characteristics of the network 331 and/or the computer network 403 as described herein with respect to FIG. 3 and FIG. 4. For example, the browsing computing device 100 may be connected (e.g., by a wireless connection and/or a wired connection) to the one or more networks 140 by a local area network (LAN) (e.g., LAN 325), a wide area network (WAN) (e.g., WAN 329), and/or other communication links (e.g., communications links 402 and/or 405).

Figure 3:
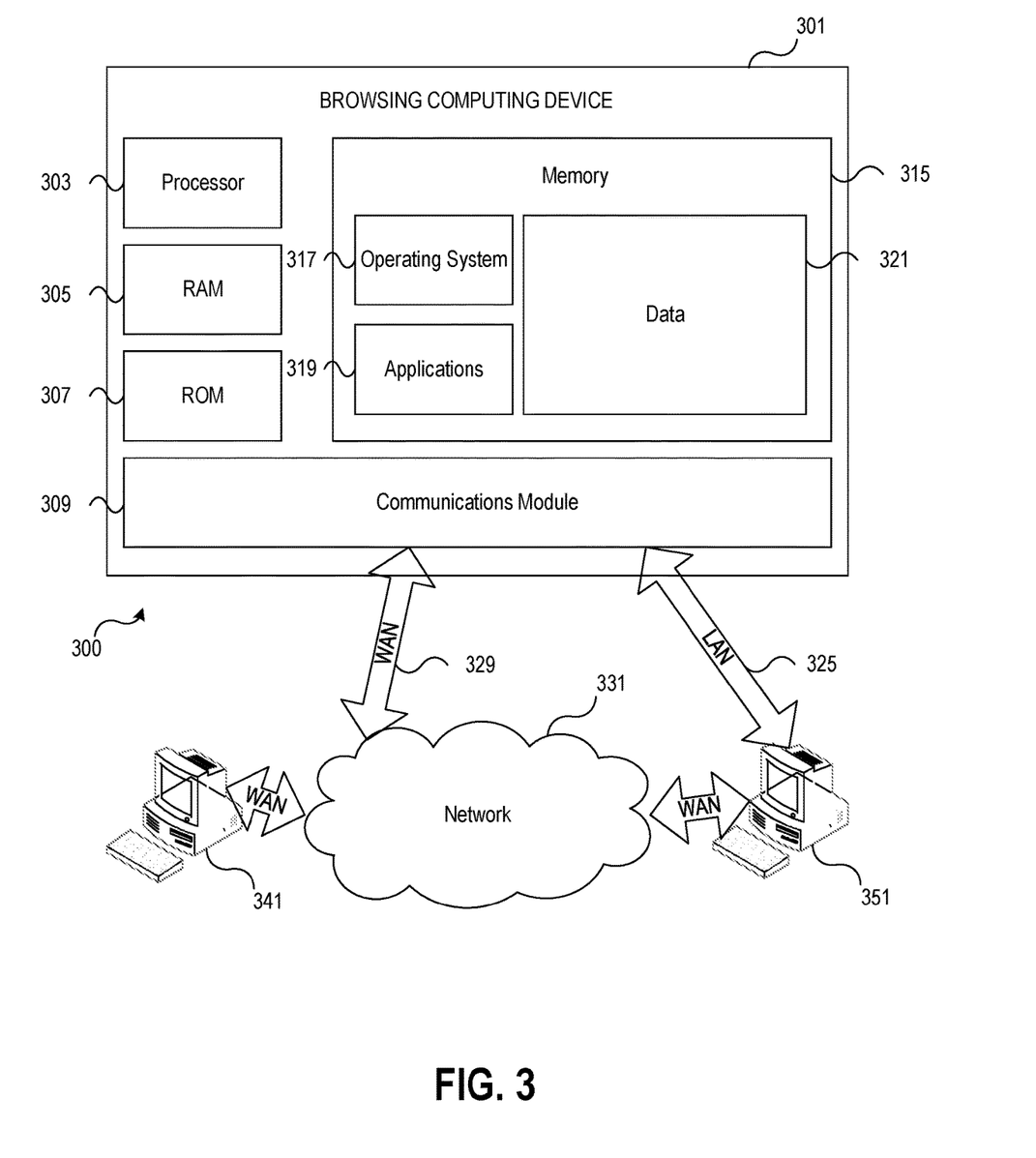
FIG. 3 shows an illustrative operating environment in which various aspects of the disclosure may be implemented in accordance with one or more aspects described herein.

Referring to FIG. 3, an illustrative operating environment 300 in which various aspects of the present disclosure may be implemented in accordance with one or more example embodiments. A computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative browsing computing device 301 having a processor 303 for controlling overall operation of the browsing computing device 301 and its associated components, including a Random Access Memory (RAM) 305, a Read-Only Memory (ROM) 307, a communications module 309, and a memory 315. The browsing computing device 301 may include a variety of computer readable media. Computer readable media may be any available media that may be accessed by the browsing computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the browsing computing device 301.

Although not required, various aspects described herein may be embodied as a method, a computing (e.g., data transfer) system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the browsing computing device 301. Such a processor may execute computer-executable instructions stored on a computer-readable medium.

Software may be stored within the memory 315 and/or other digital storage to provide instructions to the processor 303 for enabling the browsing computing device 301 to perform various functions as discussed herein. For example, the memory 315 may store software used by the browsing computing device 301, such as an operating system 317, one or more application programs 319 (e.g., a web browser application), and/or an associated database 321. In addition, some or all of the computer executable instructions for the browsing computing device 301 may be embodied in hardware or firmware. Although not shown, the RAM 305 may include one or more applications representing the application data stored in the RAM 305 while the browsing computing device 301 is on and corresponding software applications (e.g., software tasks) are running on the browsing computing device 301.

The communications module 309 may include a microphone, a keypad, a touch screen, and/or a stylus through which a user of the browsing computing device 301 may provide input, and may include one or more of a speaker for providing audio output and a video display device for providing textual, audiovisual and/or graphical output. The computing system environment 300 may also include optical scanners (not shown).

The browsing computing device 301 may operate in a networked environment supporting connections to one or more remote computing devices, such as the computing devices 341 and 351. The computing devices 341 and 351 may be personal computing devices or servers that include any or all of the elements described above relative to the browsing computing device 301.

The network connections depicted in FIG. 3 may include a Local Area Network (LAN) 325 and/or a Wide Area Network (WAN) 329, as well as other networks. When used in a LAN networking environment, the browsing computing device 301 may be connected to the LAN 325 through a network interface or adapter in the communications module 309. When used in a WAN networking environment, the browsing computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more servers 150 may communicatively connected to the one or more networks 140 by a LAN (e.g., LAN 325), a WAN (e.g., WAN 329), and/or other communication links (e.g., communications links 402 and/or 405). The one or more servers may include a server 151, a server 152, and/or a server 153. The one or more servers 150 may host one or more services and/or websites (e.g., financial websites, social media websites, e-commerce websites), where the one or more services and/or websites may be accessible by one or more communication protocols (e.g., HTTP and/or HTTPS). For example, the server 151 may host the remote service 161. The server 152 may host the remote service 162. The server 153 may host the remote service 163. The service(s) hosted by the one or more servers 150 may include one or more certificates (e.g., TLS/SSL certificates), where the one or more certificates are issued by one or more CAs. For example, the remote service 161 hosted by the server 151 may include a TLS/SSL certificate, where the TLS/SSL certificate was issued by a CA (e.g., a CA trusted by a web browser 112). The one or more servers 150 may include any or all of the characteristics of the server 404 as described herein with respect to FIG. 4.

Figure 4:
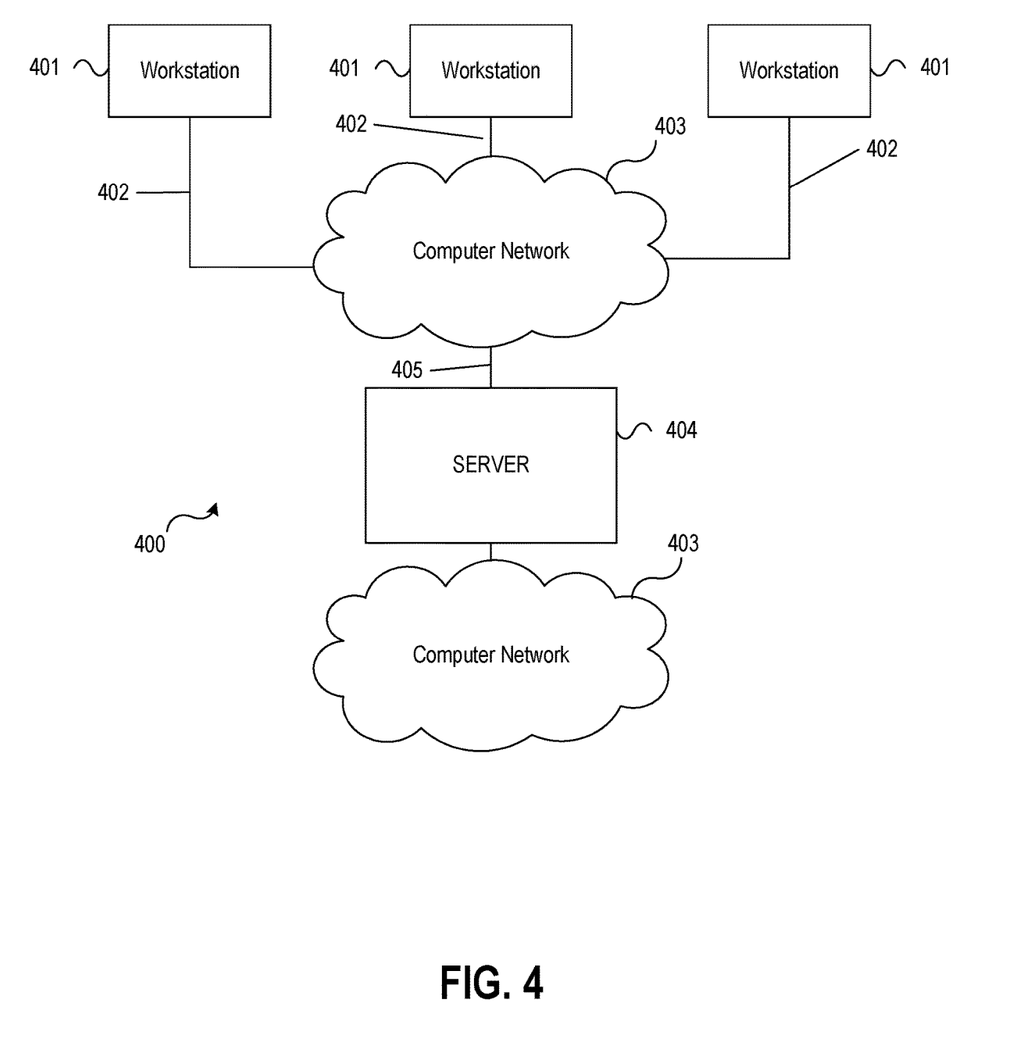
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. Referring to FIG. 4, as illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the server 404. In the system 400, the server 404 may be a server, processor, computer, or data processing device, or combination of the same, configured to perform the functions and/or processes described herein. The server 404 may host local services and/or remote services. The server 404 may receive requests and send responses based on the protocol(s) associated with the local services and/or remote services. The server 404 may include one or more certificates associated with local services and/or remote services.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the server 404, such as network links, dial-up links, wireless links, hard-wired links, as well as network types developed in the future, and the like.

Returning to FIG. 1A, the browsing computing device 100 may, for example, include a web browser 112. The web browser 112 may be an application (e.g., an application 119) stored on computer readable media device (e.g., the memory 115) of the browsing computing device 100. The web browser 112 may enable the browsing computing device 100 to access information on the World Wide Web (e.g., hosted by the one or more servers 150), for example, based on requests (and responses) via HTTP and/or HTTPS. For example, the web browser 112 may access and/or communicate with the remote service 161, the remote service 162, and/or the remote service 163 via the network 140. In some cases, the web browser 112 may trust one or more CAs. In some cases, the browsing computing device 100 may include a secure extension 113. The secure extension 113 may be an application, an extension, a plugin, and/or a program that integrates with and/or modifies the functionality of a web browser (e.g., the web browser 112). The secure extension 113 may be stored on a computer readable media device (e.g., the memory 115) of the browsing computing device 100. The secure extension 113 may be available in one or more configurations/versions for compatibility with one or more web browsers. The secure extension 113 may be managed/configured by a developer and/or an enterprise organization associated with the browsing computing device 100 and/or a user of the browsing computing device 100. For example, an enterprise organization may install the secure extension 113 on a browsing computing device 100 associated with an individual of the enterprise organization.

In some cases, the secure extension 113 may be configured to trust one or more CAs. The secure extension 113 may include and/or access (e.g., via a network 140) a data store including one or more CAs trusted by the secure extension. The data store may include one or more certificates issued by the one or more CAs. The data store may include public keys associated with the one or more CAs trusted by the secure extension 113. The one or more CAs trusted by the secure extension 113 may include any or all of the CAs trusted by the web browser 112. In some cases, the one or more CAs trusted by the secure extension 113 may include CAs different from the CAs that are trusted by the web browser 112. The secure extension 113 may limit the CAs trusted by the web browser 112 to the one or more CAs trusted by the secure extension 113. The one or more CAs may issue digital certificates (e.g., TLS/SSL certificates) associated with one or more domains and/or host names. The certificates may include identifying information for the issuer (e.g., the CA) of each certificate and/or the subject (e.g., the recipient) of each certificate.

In some cases, the secure extension 113 may perform one or more operations to determine whether communications to/from the web browser 112 are compromised (e.g., by a middle agent operating at the browsing computing device 100 and/or at an intermediate network device). The secure extension 113 may perform the one or more operations, for example, based on satisfaction of one or more conditions. In some cases, the one or more conditions may include a connection and/or an attempted connection to an HTTPS service. Based on a connection and/or an attempted connection to an HTTPS service, the secure extension 113 may perform the one or more operations. For example, a user may access a social media website using HTTP via the web browser 112. To input login credentials at the social media website, the protocol of the website may change to an HTTPS login webpage. Based on the connection to the HTTPS login webpage, the secure extension 113 may perform the one or more operations. In some cases, the one or more conditions may include an activation and/or startup of the web browser 112. Based on startup of the web browser 112, the secure extension 113 may perform the one or more operations. In some cases, the one or more conditions may include a connection and/or an attempted connection to one or more configured services (e.g., domains) via the web browser 112. The one or more configured services may be configured by a developer and/or enterprise organization associated with the secure extension 113. For example, an enterprise organization may configure an authentication web page associated with the domain of the enterprise organization as a configured service. Based on an attempted connection (e.g., sending a connection request) to a configured service (e.g., the remote services 161, 162, and/or 163), the secure extension 113 may perform the one or more operations. In some cases, the condition may be the expiration of a time duration (e.g., a periodic time duration). The time duration may be configured by a developer and/or enterprise organization associated with the secure extension 113. Based on the expiration of the time duration, the secure extension 113 may perform the one or more operations.

In some cases, the secure extension 113 may send (and/or cause the web browser 112 to send) an HTTPS request to a remote service (e.g., the remote service 161). The secure extension 113 may send (and/or cause the web browser 112 to send) the HTTPS request to a known (e.g., trusted) remote service identified in a service configuration of the secure extension 113. The service configuration of the secure extension may be configured/defined by a developer and/or enterprise organization associated with the secure extension 113. For example, an enterprise organization may configure a file sharing website associated with the enterprise organization as a known remote service in the service configuration. The file sharing website may receive the HTTPS request (e.g., from the secure extension 113 and/or web browser 112). The file sharing website may send an HTTPS response, for example, based on receiving the HTTPS request. The HTTPS response may include a TLS/SSL certificate associated with the file sharing web site. The TLS/SSL certificate included in the HTTPS response may be issued by a CA that is trusted by the secure extension 113.

In some cases, the secure extension 113 may receive the HTTPS response from the remote service 163. The secure extension 113 may identify the certificate included in the HTTPS response. The secure extension 113 may determine that the signature of the certificate included in the received HTTPS response is valid. The secure extension 113 may determine the validity period (e.g., the period of time for which the certificate is valid) of the certificate to be active. The secure extension 113 may determine the certificate has not revoked by the issuer (e.g., the CA) of the certificate) and that the certificate is active. The secure extension 113 may determine that the issuer of the certificate is a CA of the one or more CAs trusted by the secure extension 113. The secure extension 113 may determine that the received HTTPS response includes a valid certificate, for example, based on determining the signature of the certificate is valid, the validity period of the certificate is active, the certificate has not been revoked by the issuer, and that the issuer of the certificate is a CA of the one or more CAs trusted by the secure extension 113. The secure extension 113 may determine that communications via the web browser 112 are secure (e.g., secure from a middle agent 130), for example, based on determining that the received HTTPS response includes a known/valid certificate. The secure extension 113 may be configured to associate a valid certificate with secure communications that do not include a middle agent (e.g., middle agent 130) operating at the browsing computing device 100 and/or at an intermediate network device included in the network 140. The secure extension 113 may generate one or more notifications for display at a display device (e.g., of the communications module 109) of the browsing computing device 100. For example, based on determining that the certificate is signed by a CA that is trusted by the secure extension 113, the secure extension 113 may generate a notification for display that indicates the communications of the web browser 112 are secure.

Referring to FIG. 1B, the browsing computing device 100 may be compromised by a middle agent 130. The middle agent 130 may be stored on a computer-readable media device (e.g., memory 115) of the browsing computing device 100. For example, the middle agent 130 may be installed at a same directory (e.g., of a file system of the memory 115) as the web browser 112. In some cases, the middle agent 130 be installed at the browsing computing device 100 by a malicious application and/or malicious program (e.g., malware). For example, a user of the browsing computing device 100 may cause, either intentionally or unintentionally, the middle agent 130 to be installed, such as from a malicious email attachment. The middle agent 130 may be an application, an extension, a program, and/or a plugin that monitors and/or intercepts communications sent/ received by the web browser 112. The middle agent 130 may operate at the browsing computing device 100 without the consent/permission of the browsing computing device 100 and/or the user of the browsing computing device 100. In some cases, the middle agent 130 may integrate with the web browser 112.

In some cases, the middle agent 130 may perform one or more operations. The middle agent 130 may operate as a "man in the middle" agent and/or a "man in the browser" agent, where the middle agent 130 may intercept communications between the web browser 112 of the browsing computing device 100 and a local service and/or a remote service (e.g., the remote service 162). The middle agent 130 may intercept communications via HTTP and/or HTTPS. Based on the intercepted communications between the web browser 112 of the and a local service and/or a remote service, the middle agent 130 may route further communications accordingly between the web browser 112 and the local service and/or the remote service to the middle agent 130. The middle agent 130 may intercept communications via HTTPS, for example, based on using a certificate associated with the middle agent 130. The middle agent 130 may operate as a proxy between the web browser 112 of the browsing computing device 100 and a remote service (e.g., the remote service 163) hosted by a server (e.g., server 153).

In some cases, the middle agent 130 may generate and send HTTP and/or HTTPS communications. For example, the middle agent 130 may generate and send an HTTPS response to the web browser 112 in response to intercepting an HTTPS response from a remote service 161. The generated communications may include payload information from the intercepted/received request and/or response, a certificate associated with the middle agent 130 (for HTTPS communications), and/or expected source information from a service indicated in the intercepted/received communications. For example, the middle agent 130 may generate and send an HTTPS response to the web browser 112 that includes information identifying the remote service 161 as the source of the HTTP response, where the middle agent 130 previously intercepted an HTTPS request from the web browser 112 that indicated the remote service 161 as the destination of the HTTPS request.

In some cases, based on a condition as described herein, the secure extension 113 may send (and/or cause the web browser 112 to send) an HTTPS request to a remote service (e.g., the remote service 161) of one or more remote services hosted by the one or more servers 150. The secure extension 113 may send (and/or cause the web browser 112 to send) the HTTPS request to a known (e.g., trusted) remote service identified in a service configuration of the secure extension 113. The middle agent 130 may intercept the HTTPS request. Based on receiving the HTTPS request, the middle agent 130 may identify the contents of the intercepted/received HTTPS request.

For example, the middle agent 130 may identify endpoint credentials of the web browser 112 in the intercepted/received HTTPS request and generate an HTTPS request with endpoint credentials for the middle agent 130 and with payload information from the intercepted/received HTTPS request. The middle agent 130 may generate and/or forward an HTTPS request to a service (e.g., the remote service 161) via the one or more networks 140, where the service is indicated in the intercepted/received HTTPS request. In some cases, the middle agent 130 may generate and/or forward an HTTPS request to a service (e.g., a malicious website) via the one or more networks 140, where the service is different from the service (e.g., the remote service 161) indicated in the intercepted/received HTTPS request. The remote service and/or another service may receive the HTTPS request from the middle agent 130. The remote service and/or another service may send an HTTPS response, for example, based on receiving the HTTPS request. The HTTPS response may include a certificate (e.g., TLS/SSL certificate) (and/or other credential information) associated with the remote service. The certificate may be issued by a CA that is trusted by the secure extension 113, for example, if the HTTPS response was sent by the remote service. The certificate may not be issued by a CA that is trusted by the secure extension 113, for example, if the HTTPS response was sent by a service different from the remote service. The certificate may include valid and/or invalid (e.g., unsigned, self-signed, and the like) signature information. The certificate may include an active and/or an inactive validity period. In some cases, the certificate may be revoked by the issuer (e.g., the CA) of the certificate.

In some cases, the middle agent 130 may intercept and/or receive the HTTPS response. The intercepted/received HTTPS response may be from the remote service (e.g., the remote service 161) and/or another service. Based on receiving and/or intercepting the HTTPS response, the middle agent 130 may identify the contents of the intercepted/received HTTPS response. For example, the middle agent 130 may identify the certificate included in the intercepted/received HTTPS response. The middle agent 130 may generate an HTTPS response that includes a certificate associated with (e.g., signed by and/or issued by) the middle agent 130. The HTTPS response may include information identifying the remote service and/or another service as the source of the HTTPS response. The middle agent 130 may send/forward the HTTPS response to the web browser 112 (and the secure extension 113).

The secure extension 113 may receive the HTTPS response from the middle agent 130. The secure extension 113 may determine that the signature of the certificate included in the received HTTPS response is invalid. For example, the secure extension 113 may determine the validity period (e.g., the period of time for which the certificate is valid) of the certificate is not active (e.g., expired). The secure extension 113 may determine the certificate has been revoked by the issuer (e.g., the CA) of the certificate. The secure extension 113 may determine that the issuer of the certificate is not a CA of the one or more CAs trusted by the secure extension 113. The secure extension 113 may determine that the received HTTPS response includes an unknown/invalid certificate, for example, based on determining the signature of the certificate is invalid, the validity period of the certificate is not active (e.g., expired), the certificate has been revoked by the issuer, and/or that the issuer of the certificate is not a CA of the one or more CAs trusted by the secure extension 113.

The secure extension 113 may determine that communications via the web browser 112 are compromised, for example, based on determining that the received HTTPS response includes an unknown/invalid certificate. The secure extension 113 may be configured to associate an unknown/invalid certificate with compromised communications that include a middle agent (e.g., middle agent 130) operating on the browsing computing device 100 and/or on an intermediate network device. The secure extension 113 may generate one or more notifications for display at a display device (e.g., of the communications module 109) of the browsing computing device 100. For example, based on receiving an HTTPS response with an unknown/invalid certificate, the secure extension 113 may generate a notification for display that indicates the communications of the web browser 112 are compromised. In some cases, the secure extension 113 may close/deactivate a webpage (e.g., a tab), a window, and/or a session of the web browser 112, for example, based on determining the received HTTPS response includes an unknown/invalid certificate. For example, the secure extension 113 may close an HTTPS login webpage to prevent sending sensitive login credentials based on determining the received HTTPS response includes an unknown/invalid certificate. Additionally or alternatively, the secure extension 113 may deactivate communications to and/or from the web browser 112, for example, based on determining the received response is an HTTP response.

Referring to FIG. 1C, in some cases, the one or more networks 140 may be compromised by a middle agent 130 operating at a computing device 102 between the browsing computing device 100 and the one or more servers 150. The middle agent 130 may be stored on a computer-readable media device (e.g., memory 115) of a computing device 102. The computing device 102 may be an endpoint computing device (e.g., a laptop computer, a desktop computer, mobile phone, tablet, and the like). Additionally or alternatively, the computing device 102 may be a network device (e.g., a router device, a modem device, and the like) of the one or more networks 140. In some cases, the computing device 102 may be operated by a malicious third party that may access the one or more networks 140. For example, a third party may cause the middle agent 130 to be installed on a router device (e.g., computing device 102) of the one or more networks 140. In some cases, the middle agent 130 may operate at the computing device 102 without the consent/permission of the computing device 102 and/or a user of the computing device 102.

In some cases, the secure extension 113 may send an HTTPS request to a remote service (e.g., the remote service 161) of one or more remote services hosted by the one or more servers 150. The secure extension 113 may send the HTTPS request to a known (e.g., trusted) remote service identified in a service configuration of the secure extension 113. The middle agent 130 may intercept and/or receive the HTTPS request at the computing device 102 via the one or more networks 140. Based on receiving the HTTPS request, the middle agent 130 may identify the contents of the HTTPS request. The middle agent 130 may generate and/or forward an HTTPS request to an intended recipient of the message such as a service (e.g., the remote service 161) via the one or more networks 140, where the service is indicated in the intercepted/received HTTPS request. In some cases, the middle agent 130 may generate and/or forward an HTTPS request to a service (e.g., a malicious website) via the one or more networks 140, where the service is different from the service (e.g., the remote service 161) indicated in the intercepted/received HTTPS request. The remote service and/or another service may receive the HTTPS request from the middle agent 130. The remote service and/or another service may send an HTTPS response, for example, based on receiving the HTTPS request. The HTTPS response may include a certificate as described herein with respect to FIG. 1B.

In some cases, the middle agent 130 may intercept and/or receive the HTTPS response at the computing device 102 via the one or more networks 140. The intercepted/received HTTPS response may be from the remote service (e.g., the remote service 161) and/or another service. Based on intercepting and/or receiving the HTTPS response, the middle agent 130 may identify the contents of the intercepted/received HTTPS response. The middle agent 130 may generate an HTTPS response that includes a certificate associated with (e.g., signed by and/or issued by) the middle agent 130. The HTTPS response may include information identifying the remote service and/or another service as the source of the HTTPS response. The middle agent 130 may generate an HTTPS response, for example, by replacing the certificate of the remote service (e.g., the remote service 161) and/or another service with a certificate associated with (e.g., signed by and/or issued by) the middle agent 130. The middle agent 130 may send/forward an HTTPS response to the web browser 112 (and the secure extension 113) via the one or more networks 140.

The secure extension 113 may receive the HTTPS response from the middle agent 130 (and the computing device 102) via the one or more networks 140. The secure extension 113 may determine that the signature of the certificate included in the received HTTPS response is invalid. The secure extension 113 may determine the validity period (e.g., the period of time for which the certificate is valid) of the certificate is not active (e.g., expired). The secure extension 113 may determine the certificate has been revoked by the issuer (e.g., the CA) of the certificate. The secure extension 113 may determine that the issuer of the certificate is not a CA of the one or more CAs trusted by the secure extension 113. The secure extension 113 may determine that the received HTTPS response includes an unknown/invalid certificate, for example, based on determining the signature of the certificate is invalid, the validity period of the certificate is not active, the certificate has been revoked by the issuer, and/or that the issuer of the certificate is not a CA of the one or more CAs trusted by the secure extension 113. The secure extension 113 may determine that communications via the web browser 112 are compromised, for example, based on determining that the received HTTPS response includes an unknown/invalid certificate. The secure extension 113 may be configured to associate an unknown/invalid certificate with compromised communications that include a middle agent (e.g., middle agent 130) operating on the browsing computing device 100 and/or on an intermediate network device (e.g., the computing device 102). The secure extension 113 may generate one or more notifications for display at a display device (e.g., of the communications module 109) of the browsing computing device 100. In some cases, the secure extension 113 may close/deactivate a webpage (e.g., a tab), a window, and/or a session of the web browser 112, for example, based on determining the received HTTPS response includes an unknown/invalid certificate. Additionally or alternatively, the secure extension 113 may deactivate communications to and/or from the web browser 112, for example, based on determining the received response is an HTTP response.

Figure 2:
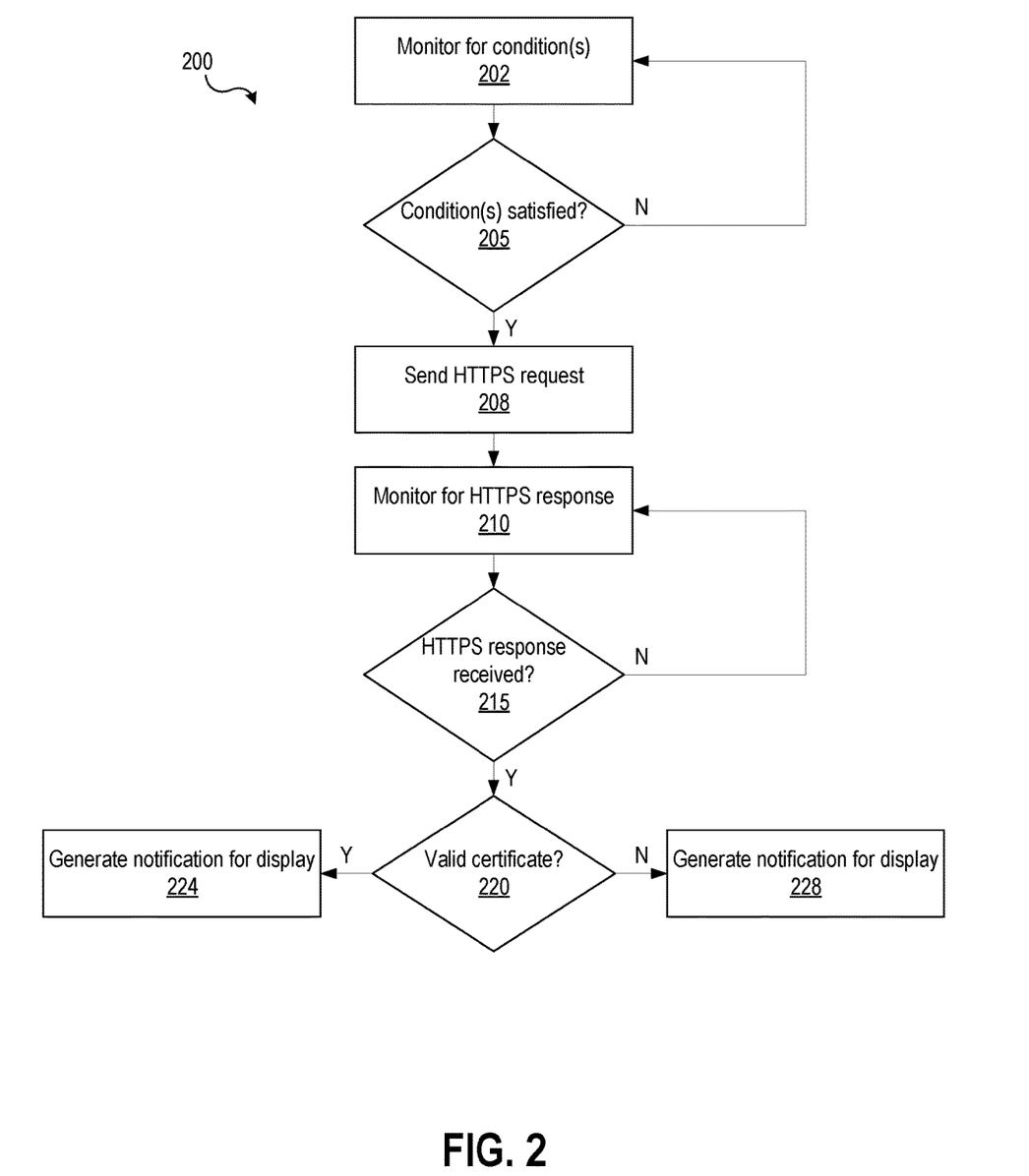
FIG. 2 shows an illustrative event sequence for a middle agent detection in accordance with one or more aspects described herein.

FIG. 2 shows an illustrative event sequence 200 for a middle agent detection in accordance with one or more aspects described herein. One or more steps of the illustrative event sequence 200 may be performed by the secure extension 113 as an extension of the web browser 112 and/or may be performed by a modified web browser that includes the functionality of secure extension 113 as described herein. The secure extension 113 may perform the one or more steps of the illustrative event sequence 200, for example, if the web browser is active (e.g., running, operating, and the like) on the browsing computing device 100. Referring to FIG. 2, the secure extension 113 may monitor the web browser 112, outgoing network communications, and/or incoming network communications for one or more conditions at 202. The one or more conditions may include an activation and/or startup of the web browser 112. The one or more conditions may include a connection and/or attempted connection (e.g., a connection request) to an HTTPS service via the web browser 112. The one or more conditions may include a connection and/or an attempted connection (e.g., a connection request) to one or more configured services (e.g., domains) and/or configured webpages of configured services via the web browser 112. The one or more configured services may be configured by a developer and/or enterprise organization associated with the secure extension 113 and/or associated with a computing device that includes the secure extension 113 (e.g., the browsing computing device 100). For example, a developer may configure only a login web page for the web domain of an e-commerce organization as a configured service and may not configure the web domain of the e-commerce organization as a configured service. The one or more conditions may include the expiration of a time duration (e.g., a periodic time duration) that may be configured by a developer and/or enterprise organization associated with the secure extension 113 and/or associated with a computing device that includes the secure extension 113 (e.g., the browsing computing device 100). For example, an enterprise organization associated with the browsing computing device 100 may configure a time duration of 10 minutes, where the secure extension 113 may determine that the condition is satisfied at the expiry of the time duration.

The secure extension 113 may determine whether a condition of the one or more conditions is satisfied at 205. In some cases, the secure extension 113 may determine whether more than one of the one or more conditions is satisfied. In some cases, the secure extension 113 may require more than a threshold number of conditions to be satisfied. For example, the secure extension 113 may require the browsing computing device 100 to access a service that is an HTTPS service and a configured service via the web browser 112 to satisfy the condition. The threshold number of conditions may be configured by a developer and/or enterprise organization associated with the secure extension 113 and/or associated with a computing device that includes the secure extension 113 (e.g., the browsing computing device 100). Based on determining whether a condition (and/or threshold number of conditions) of the one or more conditions is satisfied, the secure extension 113 may determine that at least one condition and/or greater than a threshold number of conditions of the one or more conditions is/are satisfied. Based on determining that a condition (and/or greater than a threshold number of conditions) of the one or more conditions is satisfied, the illustrative event sequence 200 may proceed to 208 as described herein. Based on determining a condition (and/or less than or equal to a threshold number of conditions) of the one or more conditions is/are not satisfied, the secure extension 113 may continue to monitor for one or more conditions at 202 as described herein.

The secure extension 113 may send (and/or cause the web browser 112 to send) an HTTPS request at 208. The secure extension 113 may send (and/or cause the web browser 112 to send) the HTTPS request, for example, via the web browser 112 (and by the one or more networks 140). The secure extension 113 may send (and/or cause the web browser 112 to send) the HTTPS request, for example, based on determining a condition (or more than a threshold number of conditions) of the one or more conditions is/are satisfied. The secure extension 113 may send (and/or cause the web browser 112 to send) the HTTPS request to a remote service (e.g., the remote service 161, the remote service 162, and/or the remote service 163). The remote service may be configured in a service configuration of the secure extension 113. The remote service may be a known remote service, where a certificate (e.g., TLS/SSL certificate) associated with the remote service is issued by a CA of one or more CAs that are trusted by the secure extension 113. The secure extension 113 may monitor for an HTTPS response at 210. The secure extension 113 may monitor for an HTTPS response such as, for example, via the web browser 112. The secure extension 113 may determine whether an HTTPS response has been received at 215. Based on determining that an HTTPS response has been received, the illustrative event sequence 200 may proceed to 220 as referred to in FIG. 2B. Based on determining that an HTTPS response has not been received, the secure extension 113 may continue to monitor for a response at 210 as described herein.

The secure extension 113 may determine whether a certificate included in the HTTPS response is valid at 220. To determine whether the certificate is valid, the secure extension 113 may perform one or more operations. The one or more operations may include determining whether the signature of the certificate included in the received HTTPS response is valid. The one or more operations may include determining whether the validity period (e.g., the period of time for which the certificate is valid) of the certificate is active. The one or more operations may include determining whether the certificate has been revoked by the issuer (e.g., the CA) of the certificate. The one or more operations may include determining whether the issuer of the certificate is a CA of the one or more CAs trusted by the secure extension 113.

The secure extension 113 may determine that the certificate included in the received HTTPS response is a valid certificate. The secure extension 113 may determine that the certificate included in the received HTTPS response is a valid certificate, for example, based on determining the signature of the certificate is valid, the validity period of the certificate is active, the certificate has not been revoked by the issuer (e.g., the CA), and that the issuer of the certificate is a CA of the one or more CAs trusted by the secure extension 113. The secure extension 113 may determine that communications via the web browser 112 are secure and generate a notification for display at 224. The secure extension 113 may determine that communications via the web browser 112 are secure and generate a notification for display, for example, based on determining that the certificate included in the received HTTPS response is a valid certificate. The notification may include an indication that communications via the web browser 112 are secure.

The secure extension 113 may determine that the certificate included in the received HTTPS response is an unknown/invalid certificate. The secure extension 113 may determine that the certificate included in the received HTTPS response is an unknown/invalid certificate, for example, based on determining the signature of the certificate is invalid, the validity period of the certificate is not active (e.g., expired), the certificate has been revoked by the issuer (e.g., the CA), and/or that the issuer of the certificate is not a CA of the one or more CAs trusted by the secure extension 113. The secure extension 113 may determine that communications via the web browser 112 are compromised (e.g., by the middle agent 130) and generate a notification for display at 228. The secure extension 113 may determine that communications via the web browser 112 are compromised (e.g., by the middle agent 130) and generate a notification for display, for example, based on determining that the certificate included in the received HTTPS response is an unknown/invalid certificate. The notification may include an indication that communications via the web browser 112 are compromised. Events of the illustrative event sequence 200 may be removed, supplemented, and/or otherwise modified without departing from the scope of the present disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system comprising:
a server hosting a trusted service, wherein the trusted service provides a trusted certificate issued by one or more certificate authorities; and
a computing device, comprising:
a processor;
a communication interface communicatively coupled to the processor; and
non-transitory memory storing computer-readable instructions that, when executed by the processor, cause the computing device to:
monitor, by a secure extension of a web browser, outgoing enterprise network connections for a connection request to a remote service;
send, via a network based on an indication of the connection request to the remote service and by the secure extension, a Hypertext Transfer Protocol Secure (HTTPS) request to the trusted service, wherein the trusted service is different than the remote service and wherein the trusted service is identified in a configuration of the secure extension;
receive, by the web browser, an HTTPS response to the HTTPS request wherein the HTTP response comprises a second certificate;
identify, by the secure extension and based on the second certificate of the HTTPS response, operation of a middle agent based on an indication that the second certificate is different than the trusted certificate; and
cause, by the secure extension and via the web browser based on an identified difference between the trusted certificate and the second certificate, display an indication that enterprise network communications are compromised by the middle agent.

2. The system of claim 1, wherein the instructions further cause the computing device to:
monitor, by the secure extension, for an expiration of a time duration, wherein the time duration is defined in the configuration of the secure extension; and
send, via the network based on an indication of the expiration of the time duration and by the secure extension, the HTTPS request to the trusted service.

3. The system of claim 1, wherein the instructions further cause the computing device to:
identify, by the secure extension and based on the second certificate, an indication of certificate validity comprising: a valid response signature, an active certificate validity period, an active certificate, and a valid certificate authority; and cause, by the secure extension and via the web browser based on an identified certificate validity indication, display of a second notification, wherein the second notification comprises an indication that communications via the web browser are secure.

4. The system of claim 1, wherein the instructions further cause the computing device to monitor, by the secure extension and based on the HTTPS request, communications received by the web browser for the HTTPS response at the web browser.

5. The system of claim 1, wherein the instructions further cause the computing device to deactivate, based on an indication of certificate replacement, the web browser.

6. The system of claim 1, wherein the instructions further cause the computing device to generate, by the secure extension, an indication of certificate replacement based on an identification of one or more of:
   an invalid response signature;
   an inactive certificate validity period;
   a certificate revocation; and
   an invalid certificate authority.

7. The system of claim 1, wherein the configuration of the secure extension is defined by a developer associated with the secure extension or by an enterprise organization associated with the computing device.

8. A method, comprising:
   identifying, by a secure extension of a web browser and from outgoing enterprise network connections, a connection request to a remote service;
   sending, via a network based on an indication of the connection request to the remote service and by the secure extension, a Hypertext Transfer Protocol Secure (HTTPS) request to a trusted service, wherein the trusted service is different than the remote service and wherein the trusted service is identified in a configuration of the secure extension;
   receiving, by the web browser, an HTTPS response to the HTTPS request wherein the HTTP response comprises a second certificate;
   identifying, by the secure extension and based on the second certificate of the HTTPS response, operation of a middle agent based on an indication that the second certificate is different than a trusted certificate associated with the trusted service; and
   causing, by the secure extension and via the web browser based on an identified difference between the trusted certificate and the second certificate, display an indication that enterprise network communications are compromised by the middle agent.

9. The method of claim 8, further comprising:
   monitoring, by the secure extension, for an activation of the web browser; and
   sending, via the network based on an indication of the activation of the web browser and by the secure extension, the HTTPS request to the trusted service.

10. The method of claim 8, further comprising:
    identifying, by the secure extension and based on the second certificate, the identified difference between the trusted certificate and the second certificate based on: a response signature, an active certificate validity period, an active certificate, and a valid certificate authority.

11. The method of claim 8, further comprising:
    monitoring, by the secure extension and based on the HTTPS request, communications received by the web browser for the HTTPS response at the web browser.

12. The method of claim 8, further comprising deactivating, based on an identification of a replacement certificate, networked communications via the web browser.

13. The method of claim 8, further comprising generating, by the secure extension, an indication of a replacement certificate based on an identification of one or more of:
    an invalid response signature;
    an inactive certificate validity period;
    a certificate revocation; and
    an invalid certificate authority.

14. The method of claim 8, wherein the trusted service is accessible via network and wherein the trusted service is hosted at a server computing device.

15. One or more non-transitory computer-readable media storing instructions that, when executed by a computing device comprising a processor, memory, and a communication interface, cause the computing device to:
    identify, by a secure extension of a web browser and from outgoing enterprise network connections, a connection request to a remote service;
    send, via a network based on an indication of the connection request to the remote service and by the secure extension, a Hypertext Transfer Protocol Secure (HTTPS) request to a trusted service, wherein the trusted service is different than the remote service and wherein the trusted service is identified in a configuration of the secure extension;
    receive, by the web browser, an HTTPS response to the HTTPS request wherein the HTTP response comprises a second certificate;
    identify, by the secure extension and based on the second certificate of the HTTPS response, operation of a middle agent based on an indication that the second certificate is different than a trusted certificate associated with the trusted service; and
    cause, by the secure extension and via the web browser based on an identified difference between the trusted certificate and the second certificate, display an indication that enterprise network communications are compromised by the middle agent.

16. The one or more non-transitory computer-readable media of claim 15, wherein the trusted service is an HTTPS service or a configured domain, wherein the configured domain is identified in the configuration of the secure extension, and wherein the configuration of the secure extension is defined by a developer associated with the secure extension or by an enterprise organization associated with the computing device.

17. The one or more non-transitory computer-readable media of claim 15, wherein the instructions further cause the computing device to:
    identify, by the secure extension and based on the second certificate, an indication of certificate validity comprising: a valid response signature, an active validity period, an active certificate, and a valid certificate authority; and
    cause display, by the secure extension and via the web browser based on an identification that the second certificate is valid, of a second notification, wherein the second notification comprises an indication that communications via the web browser are secure.

18. The one or more non-transitory computer-readable media of claim 15, wherein the instructions further cause the computing device to monitor, by the secure extension and based on the HTTPS request, communications received by the web browser for the HTTPS response at the web browser.

19. The one or more non-transitory computer-readable media of claim 15, wherein the instructions further cause the computing device to deactivate, based on a certificate invalidity indication, the web browser.

20. The one or more non-transitory computer-readable media of claim 15, wherein the instructions further cause the computing device to generate, by the secure extension, a certificate invalidity indication based on an identification of one or more of:
   an invalid response signature;
   an inactive certificate validity period;
   a certificate revocation; and
   an invalid certificate authority.

* * * * *